United States Patent
Coenen

(10) Patent No.: US 6,220,009 B1
(45) Date of Patent: Apr. 24, 2001

(54) DAMPING DEVICE FOR AN OPEN-END SPINNING ROTOR MOUNTED IN A CONTACTLESS MANNER

(75) Inventor: Norbert Coenen, Mönchengladbach (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/299,998

(22) Filed: Apr. 27, 1999

(30) Foreign Application Priority Data

May 4, 1998 (DE) .............................................. 198 19 767

(51) Int. Cl.$^7$ .................................. D01H 4/00; F16F 7/02
(52) U.S. Cl. ................................ 57/406; 57/100; 57/263; 57/404; 188/290; 188/306; 310/67 R; 310/90; 310/156
(58) Field of Search .............................. 57/406, 404, 100, 57/263; 308/10, 228; 310/67 R, 70, 156; 188/290

(56) References Cited

U.S. PATENT DOCUMENTS

| | | |
|---|---|---|
| 731,054 | 6/1903 | Hoyt . |
| 4,117,359 | * 9/1978 | Wehde ................................. 310/67 |
| 4,227,755 | 10/1980 | Lundberg . |
| 5,660,254 | * 8/1997 | Spoto .................................. 188/290 |

FOREIGN PATENT DOCUMENTS

| | | |
|---|---|---|
| 223347 | 1/1909 | (DE) . |
| 844 233 | 7/1952 | (DE) . |
| 1 426 088 | 12/1968 | (DE) . |
| 25 14 054 A1 | 10/1976 | (DE) . |
| 94 20 646 U | 2/1995 | (DE) . |
| 195 43 745 A1 | 5/1997 | (DE) . |
| 1136943 | 5/1957 | (FR) . |
| 641189 | 8/1950 | (GB) . |
| 1166860 | 10/1969 | (GB) . |
| 183798 | 5/1907 | (SE) . |
| WO/90/122 | 10/1990 | (WO) . |

* cited by examiner

Primary Examiner—John J. Calvert
Assistant Examiner—Shaun R Hurley
(74) Attorney, Agent, or Firm—Kennedy Covington Lobdell & Hickman, LLP

(57) ABSTRACT

A damping device for the spinning rotor (3) of an open-end spinning device (1). The spinning rotor (3) is fixed radially and axially via a magnet support arrangement (43), supported in a galvanically separated manner as regards the housing of the spinning device (1) and rotates with a high rotary frequency. The damping device (42) converts oscillations occurring especially during the acceleration phase and when passing through the natural frequency range directly into friction losses.

20 Claims, 6 Drawing Sheets

DAMPING DEVICE FOR AN OPEN-END SPINNING ROTOR MOUNTED IN A CONTACTLESS MANNER

BACKGROUND OF THE INVENTION

The present invention relates to a damping device for a contactless, passive, radial support of a rotor rotating at a high rotary frequency, especially of a textile open-end rotor spinning device.

A rotor with passive radial support which is supported in a contactless manner, e.g., magnetically or aerostatically, has the problem that undesired radial oscillations can occur. There is the danger that the oscillations can assume a magnitude at which the radial deflection of the rotor becomes so great that the rotor makes contact with its cushioning bearing or some other close component and therefore a further increasing of the rotary frequency out of the range of the natural resonance is only possible with very great accelerations of speed of rotation or not at all. For this reason support systems are used in such instances which comprise a radial damping of oscillations.

A rotor supported in a contactless manner can be actively damped, e.g., as regards the radial excitation of oscillations. A relatively great expense for the sensory mechanism, actuator mechanism and control is necessary for this purpose.

Another possibility for radial damping of oscillations is in the form of a passive damping of oscillations in which the attempt is also made to reduce the radial deflection. Such a device is known, e.g., from German Patent Publication DE 195 437 45 A1. In this publication, the stator magnet of a magnetic bearing is elastically suspended on spring legs. The magnetic bearing, located on the stator side, is additionally held by a frictional connection which begins to start with friction upon an appropriately large oscillatory amplitude of the rotor and thus effects a damping.

It is disadvantageous, for example, in the case of a bearing arrangement in accordance with German Patent Publication DE 195 437 45 A1, that the compensation of oscillations does not become effective until the oscillatory amplitude has assumed a magnitude at which the friction begins. Before this value at which the friction device begins to operate has been achieved, there is an undamped operation. The damping act ion, which does not begin until later, is opposed by a lastingly oscillation-poor running of the rotor.

A further disadvantage is the fact that the manufacturing of the spring-leg arrangement is very difficult and expensive. Inaccuracies in it result in a radial offset and/or in an error as regards the maintaining of the desired air gap and or in an error as regards the planar parallelism of the bearing magnets, which jeopardizes the operation of the bearing arrangement.

Another disadvantage is the fact that the rigidity of the magnetic bearing is reduced by the rigidity of the spring-leg arrangement. As a result of the fact that the stator magnet fixing the rotor is not completely stationary since it was attached so that it could oscillate, the position of the rotor is inconstant in analogy with the oscillatory movements of the stator magnet. The damping oscillation of the stator magnet can result in an additional impairment of the smooth running of the rotor. An unfavorable superpositioning of the two oscillatory frequencies can not be excluded.

The above-mentioned disadvantages can occur either alone or in combination and an unobjectionable operation of the damping device is present in neither instance.

SUMMARY OF THE INVENTION

Therefore, the invention has an object, based upon the devices of the initially described type, of improving such devices. In particular, it is an object to provide a damping device which avoids the previously cited disadvantages and brings about an improved and smoother running of the spinning rotor.

The present invention achieves these and other objectives in an open-end spinning device of the type having a spinning rotor mounted to a rotor shaft and supported for rotation at a high rotary frequency by a contactless, passive, radial support. According to the present invention, a device is provided for damping the contactless, passive, radial support of the spinning rotor which comprises a friction device having friction components which include mechanically loaded friction surfaces. One of the friction components is arranged in a manner which is stationary at least radially and the other friction component is disposed for shifting its position radially, the shiftable friction component comprising a bearing component which surrounds the rotor shaft of the rotor.

This design of the present invention has the particular advantage that the occurrence of large oscillatory amplitudes at which the rotor can strike the stator is reliably avoided by the bearing component surrounding the rotor shaft. That is, it is assured in a simple manner that when the contactless, passively supported spinning rotor is highly accelerated, no problems due to oscillations which build up can occur, even when the rotor passes through the frequency ranges of its natural oscillations.

In particular, the design of the damping device in accordance with the invention has the advantage that the damping begins immediately at the first appreciable oscillations and thus rather large oscillatory amplitudes in the deflection do not occur.

In addition thereto, the non-critical manufacture of the components of the damping device is advantageous since hardly any disadvantageous influences are exerted on the rotor support itself due to manufacturing tolerances or dimension errors.

The use of a special roller bearing for high rotary frequencies is advantageous since in this manner an almost play-free "reaction" of the damping device to the oscillations produced takes place.

It is also contemplated to be possible to use an aerostatic bearing as the bearing component. This has the advantage that the damping begins immediately upon the first oscillation, just as when a roller bearing is used and in addition the bearing friction is distinctly minimized by the use of the aerostatic bearing. If an aerostatic support of the rotor itself is used an integration of the aerostatic bearing of the damping device into the radial support of the rotor would be conceivable.

As a further alternative, a plain bearing bush may be used as the bearing component, which offers an economical support. The constructive design of the plain bearing bush and of the rotor shaft with a certain bearing play provides that during the normal oscillation-free spinning operation no contact occurs between the rotor and the bearing component so that no wear occurs during normal operation. Essentially only a radial limitation of oscillation takes place when the areas of natural oscillation are passed through.

It is to be noted in all such embodiments that the particular bearing component used during normal, oscillation-free running of the rotor does not participate in the radial support of the rotor shaft.

According to one feature of the invention, friction occurs immediately after the occurrence of the first oscillation. The low-play immediate coupling between radial deflection and damping results in a direct radial damping of the rotor.

Moreover, it is preferred that the bearing component surrounds the rotor shaft with a bearing play of only a few μm which has the advantage that as a result of the minimal air gap which is present the maximum opening of the bearing location is limited and thus a protection against contamination is created at the same time.

Another aspect of the invention provides that the stationary friction component comprises a limiting bearing and the bearing component surrounds the rotor shaft with a bearing play in the area of a plain bearing bush which is less than a bearing play of the limiting bearing, which has the advantage that the difference of the two bearing plays results in an acceptable damping path. After overcoming the bearing play, initiated by an oscillation, the damping starts until either the limiting bearing play has been bridged or a friction component which can be varied in its position, e.g., a moveable friction plate, strikes against a stop.

It is preferred to provide an adjustment device for adjusting in a defined manner a contact pressure of the friction surfaces of the friction device, the adjustment device preferably being formed by at least one screw bolt. The possibility of dosing the frictional work and therewith the damping is advantageous in an adjusting device. "Damping images" from hard to soft can be adjusted as required. Adjusting of the damping device with at least one screw bolt offers the advantage of the ability to exactly dose the "damping value" of the device. An adjusting of the frictional pressure is also conceivable as an alternative, even by means of pretensioned leaf springs.

It is advantageous to limit the maximum radial path which the friction plate executes with the bearing component during oscillations. This mechanical limitation by means of a stop can also serve as a replacement for a cushioning bearing or limiting bearing.

An advantageous embodiment of a mechanical stop is created by a ring arranged on the stationary friction component. The concentricity of the ring to the rotor axis is advantageous so that a striking of the friction plate is assured in every direction on account of the closed contour of the ring.

A mechanical limitation of the radial path of the friction plate and of the bearing component may be provided by means of a suitable dimensioning of the screw bolts and of the bores in the friction plate. The advantage of this is that a separate stop is eliminated. An economical fashioning of the limitation of the radial path can be achieved relatively simply in this way.

It is further advantageous to provide an intermediate plate arranged between the friction components, which provides the advantage that an additional friction surface is formed in addition to the friction surface. As a result of the inertia of the mass, at first only the intermediate plate enters an oscillation-damping frictional resistance with the friction plate. If and when the oscillations assume an intensity at which the friction between the friction components becomes too "inert" and the intermediate plate begins to oscillate in unison a further frictional connection occurs between the intermediate plate and the stationary friction component. A double decoupling is thus achieved as regards the oscillations between the stator and the rotor.

Further details of the invention can be understood from the following disclosure of embodiments of exemplary bearing arrangements in open-end spinning devices presented with reference made to the drawings.

DESCRIPTION OF THE PREFERRED EMBODIMENTS

Figure 1:
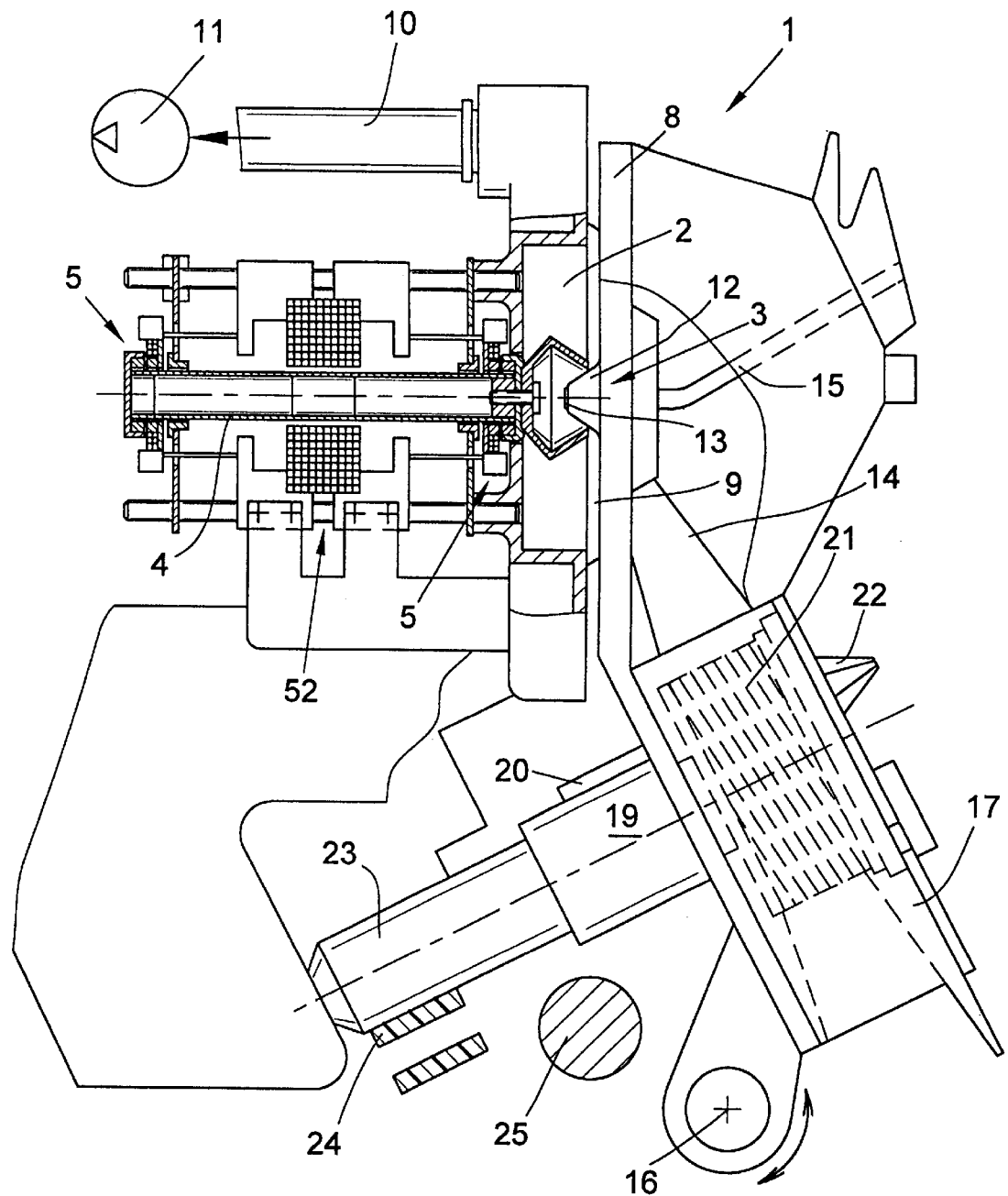
FIG. 1 is a schematic lateral elevational view, partially in cross-section, of an OE spinning device with a contactless, passive support for a spinning rotor according to the present invention.

Referring now to the accompanying drawings and initially to FIG. 1, an open-end spinning device is designated in its entirety by the reference numeral 1. This known type of spinning unit comprises, as is customary, a rotor housing 2 in which the spinning cup of a spinning rotor 3 rotates at a high speed. Spinning rotor 3 is driven by electric individual drive 52 and is fixed by its rotor shaft 4 in bearing arrangements 49, 26, 44, 45, 46 of magnetic support 5 which supports spinning rotor 3 both radially and axially.

As is customary, rotor housing 2, which is open to the front, is closed during operation by pivotably supported cover element 8 equipped with a conduit plate with seal 9 (not shown in detail). Moreover, rotor housing 2 is connected via an appropriate suction removal line 10 to vacuum source 11 which produces the spinning vacuum necessary in rotor housing 2.

Conduit plate adapter 12 is arranged in cover element 8 and in the conduit plate, which adapter 12 comprises yarn take-offjet 13 and the mouth area of yarn guide conduit 14. Yarn take-off jet 13 is followed by small yarn take-off tube 15.

In addition, opening cylinder housing 17 is fastened on cover element 8, which is mounted so that it can rotate in a limited manner about pivot axis 16. Cover element 8 also comprises bearing brackets 19, 20 on its rear side for supporting opening cylinder 21 and sliver draw-in cylinder 22. Opening cylinder 21 is driven in the area of its whorl 23 by rotating tangential belt 24 running the length of the machine whereas the drive (not shown) of sliver draw-in cylinder 22 preferably takes place via a worm gear arrangement connected to drive shaft 25 running the length of the machine.

Figure 2:
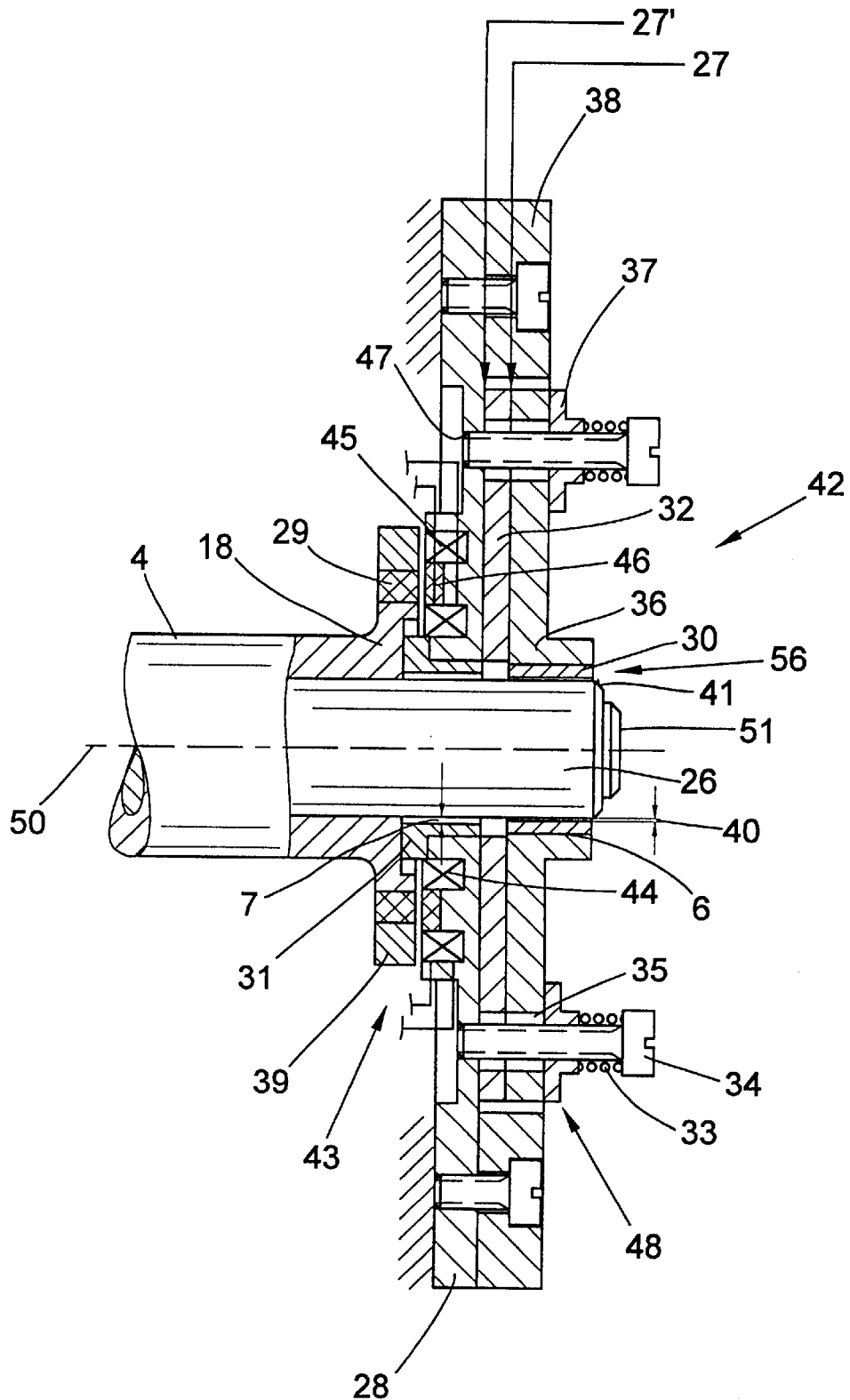
FIG. 2 is a lateral view also in partial section of the end area of a magnetic support for a spinning rotor with damping device, shown on an enlarged scale.

FIG. 2 shows damping device 42 of the invention on an enlarged scale. Damping device 42 of contactless, passive support 43 for a spinning rotor comprises a mechanical friction device 48 consisting essentially of bearing plate 28, intermediate plate 32 and of movable friction plate 36. Friction plate 36 is frictionally connected by screws 34, springs 33 and pressure platelets 37 to bearing plate 28. In addition, plain bearing bush 30 is fastened in central bore 6 of movable friction plate 36.

Moreover, permanent magnet ring 46 and concentrically arranged annular coils 44, 45, which coils can be loaded by current, are positioned in appropriate recesses of stationary bearing plate 28. These magnetic bearing components are opposed by permanent magnet bearing ring 29 at a slight interval, which ring is integrated into rotationally symmetrical collar 18 of rotor shaft 4. Bearing magnet ring 29 on the rotor side is surrounded by magnet retainer 39. In addition, a limiting bearing designated at 31 is fitted into stationary bearing plate 28.

As is apparent from FIG. 2, rotor shaft comprises chamfered area 41 on its end, which chamfered area simplifies the introduction of rotationally symmetrical shoulder or step 26 into plain bearing bush 30, which is only insignificantly larger as regards the inner diameter.

Figure 3:
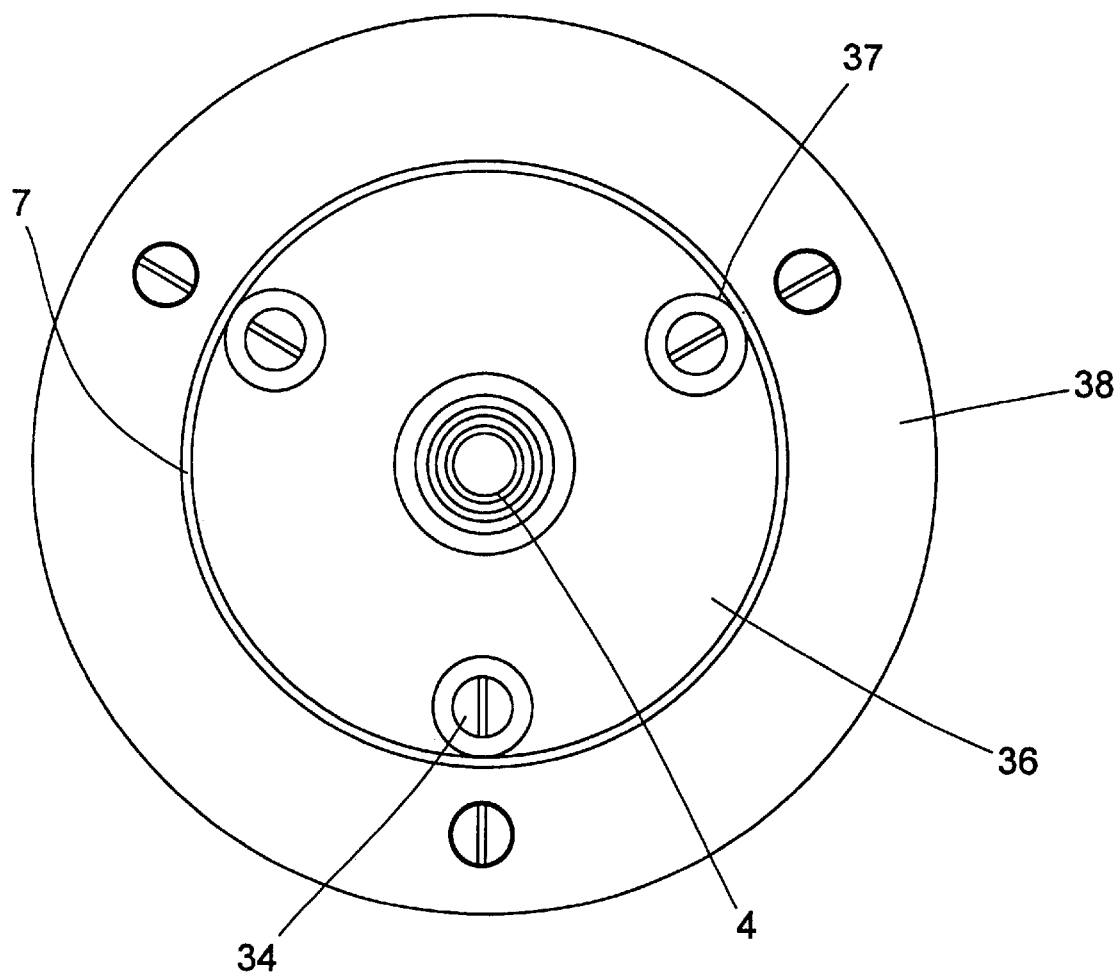
FIG. 3 is a frontal view of a damping device of the invention according to FIG. 2.

FIG. 3 shows the front view of damping device 42 described above in conjunction with FIG. 2. FIG. 3 furthermore shows circular slot 7 between friction plate 36 and stop ring 38 limiting the radial frictional path of damping device 42.

Figure 4:
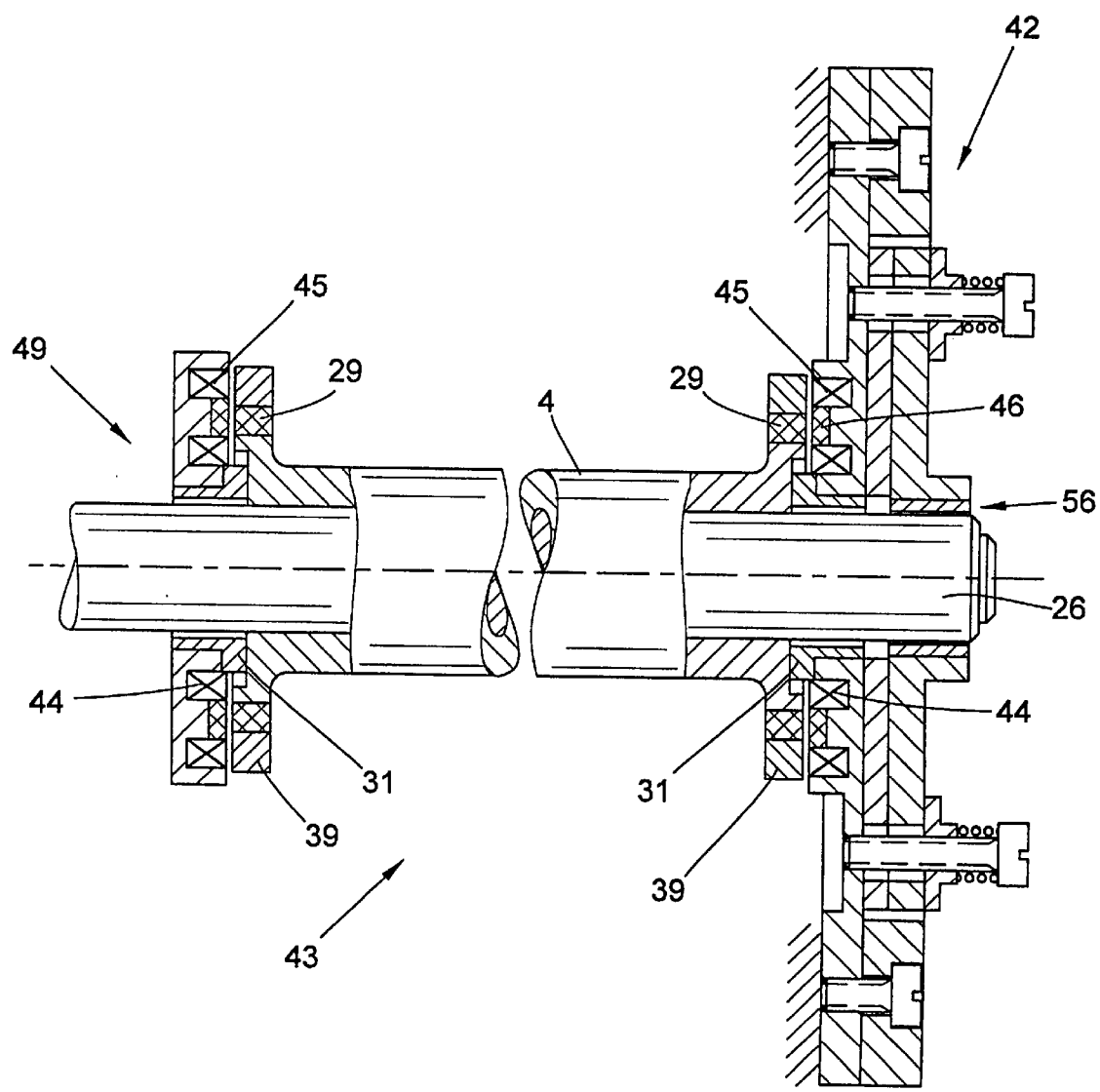
FIG. 4 is a lateral view also in partial section of both bearing arrangements of a radially damped, magnetic support for a spinning rotor.

FIG. 4 shows frontal bearing arrangement 49 on the spinning-cup side and also shows rear bearing components 26, 44, 45, 46 on the damping side in a lateral view.

Figure 5:
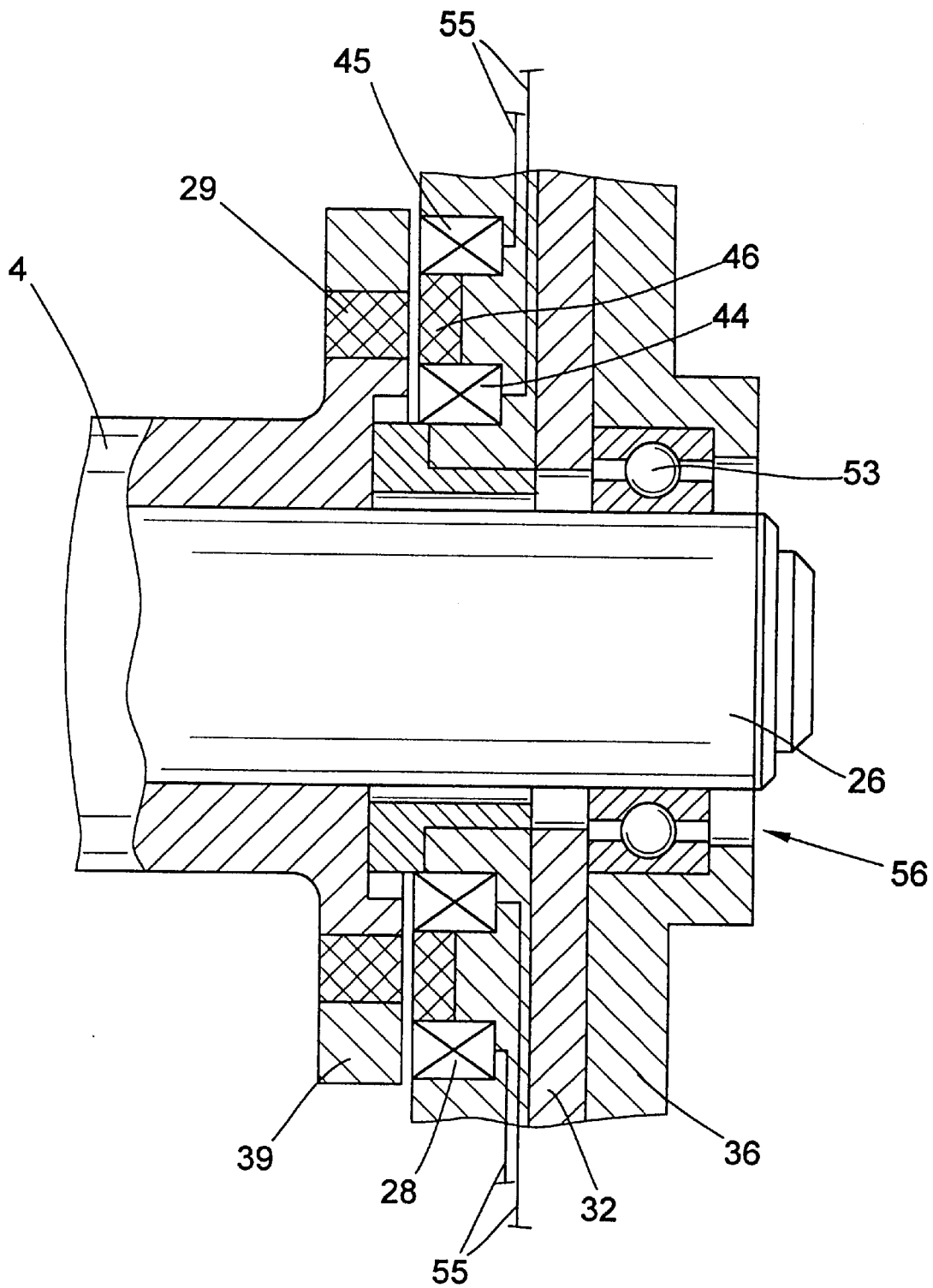
FIG. 5 is a lateral view also in partial section of the end area of a magnetic support for a spinning rotor with a roller bearing as bearing component, shown on an enlarged scale.

FIG. 5 shows friction plate 36 in an embodiment wherein the bearing component 56 is designed as part of a roller bearing 53 which rests with a slight bearing play of only a few μm around rotor shaft 4. In addition, electric coil supply leads 55 are shown.

Figure 6:
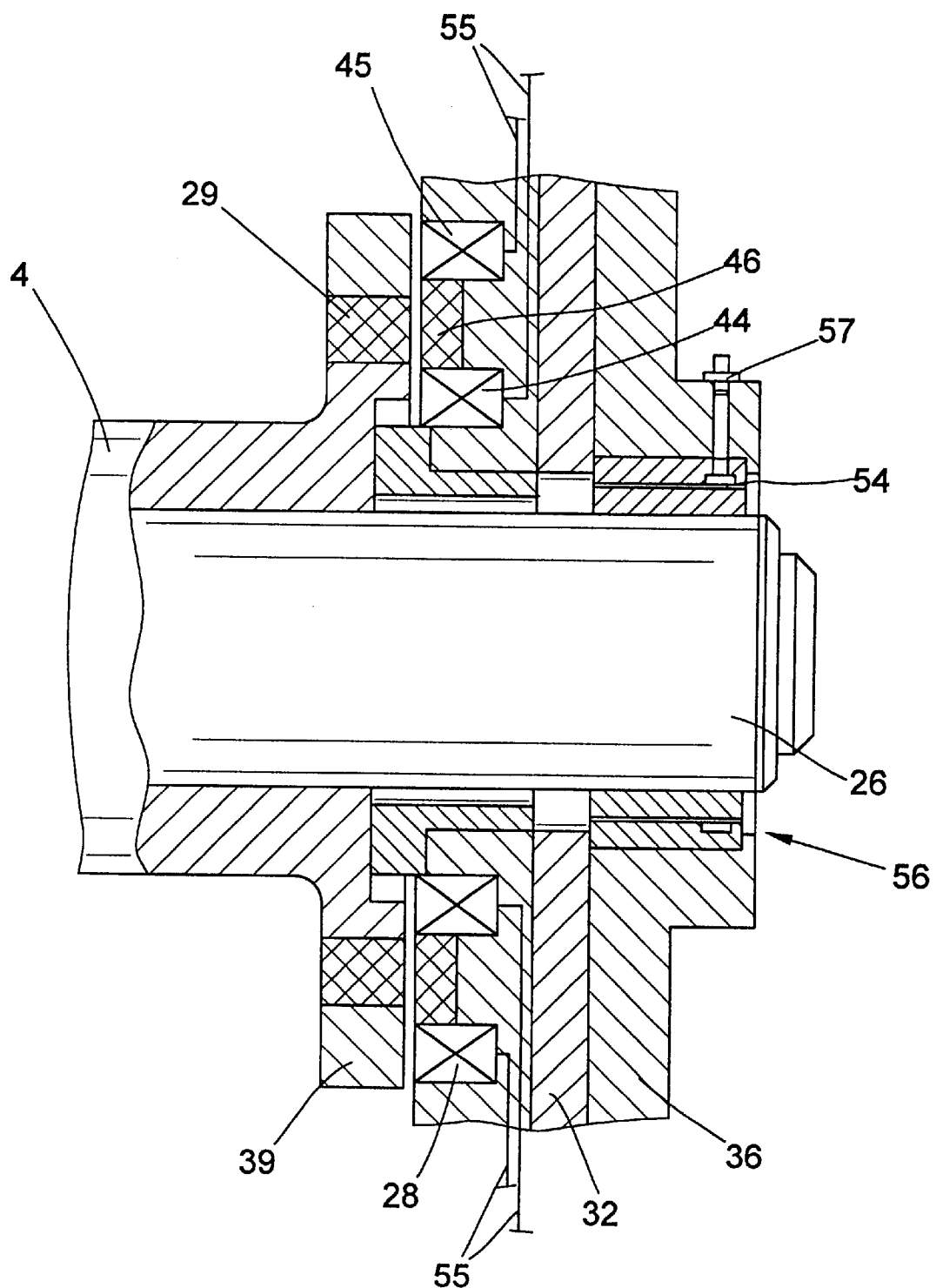
FIG. 6 is a lateral view also in partial section of the end area of a magnetic support for a spinning rotor with an aerostatic bearing as bearing component, shown on an enlarged scale.

FIG. 6 shows friction plate 36 in an embodiment wherein the bearing component 56 is designed as part of an aerostatic bearing 54. Moreover, magnet-bearing components 28, 15 29, 39, 44, 45 and 46 are shown. Reference numeral 55 designates the electric connections for coils 44, 45. The compressed-air connection designated with 57 serves to load aerostatic bearing 54 with compressed air in order to build up the necessary bearing pressure.

The operation of the damping device of the present invention may thus be understood. Offset 26 of rotor shaft 4 shown in particular in FIGS. 2 and 4 is positioned in the operating position of spinning rotor 3 within bearing component 56 of damping device 42, preferably with a little bearing play 40. Thus, when spinning rotor 3 is radially shifted when it is being run up to its operating speed, especially when passing through its critical natural frequency ranges or during the spinning process as a consequence of a usually slight imbalance occasioned by spinning material, a lateral shifting of bearing component 56 also takes place as soon as stop 26 on rotor shaft 4 has overcome bearing play 40 in the area of bearing component 56.

The radial shifting of bearing component 56 also results in a lateral shifting of movable friction plate 36, in which bearing component 56 is fixed. Frictional losses occur during the lateral shifting of movable friction plate 36, which for its part is frictionally connected to stationary bearing plate 28 by screw bolts 34, springs 33 and pressure platelets 37 as well as intermediate plate 32. These frictional losses result in a damping of the radial oscillation amplitudes of spinning rotor 3 rotating at a high speed, especially when passing through the natural frequency ranges. The frictional losses occurring during the shifting of friction plate 36 in the area of intermediate plate 32 on its friction surfaces 27, 27' can be adjusted in a defined manner thereby via adjustment device 34 comprising, e.g., at least one screw bolt.

Moreover, additional limiting bearing 31 assures that the rotor of single-motor drive 52 can not run against its stator even during operating conditions which exceed at least for a brief period the working capacity of damping device 42.

During the spinning operation, radially oscillating spinning rotor 3, whose course of oscillation frequency runs in a converging manner, constantly tends to travel in a helical manner into the middle and to become stabilized in axis of rotation 50. That is, after the oscillation of spinning rotor 3 has been quieted by damping device 42, plain bearing bush 30, for example, also stands concentrically to axis of rotation 50 so that rotationally symmetric offset 26 of spinning-rotor shaft 4 again rotates with a bearing play 40 of, e.g., approximately 0.2 mm concentrically in plain bearing bush 30.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An open-end spinning device, comprising:
   (a) a spinning rotor mounted to a rotor shaft and supported for rotation at a high rotary frequency by a contactless, passive, radial support, and
   (b) a dampening device for the contactless, passive, radial support of the spinning rotor, including,
      (i) a first friction component that is fixed against radial movement, and
      (ii) a second friction component both that connected with the first friction component to abut a friction surface therebetween, and that moves radially and slides on the friction surface, the rotor shaft extending through the second friction component and rotating relative thereto.

2. The device according to claim 1, characterized in that the second friction component comprises a roller bearing.

3. The device according to claim 1, characterized in that the second friction component comprises an aerostatic bearing.

4. The device according to claim 1, characterized in that the second friction component comprises a plain bearing bush.

5. The device according to claim 1, characterized in that the second friction component surrounds the rotor shaft with a bearing play of no more than approximately 0.2 mm.

6. The device according to claim 4, characterized in that the first friction component comprises a limiting bearing and the second friction component surrounds the rotor shaft with a bearing play in the area of the plain bearing bush which is less than a bearing play of the limiting bearing.

7. The device according to claim 1, characterized further by an adjustment device for adjusting in a defined manner a contact force of the second friction component with the friction surface.

8. The device according to claim 7, characterized in that the adjustment device comprises at least one screw bolt.

9. The device according to claim 1, characterized further by a mechanical stop that abuts and defines the maximum radial deflection of the second friction component.

10. The device according to claim 9, characterized in that the mechanical stop comprises a ring connected to the first friction component.

11. The device according to claim 9, characterized in that the mechanical stop for limiting the radial deflection of the second friction member comprises screw bolts fixed to the first friction component that extend through oversized bores defined in the second friction component.

12. The device according to claim 1, characterized further by an intermediate friction member arranged between the first and second friction components.

13. The device according to claim 12, wherein the intermediate friction member comprises a plate having planar surfaces respectively abutting the first and second friction components, and wherein the plate radially moves relative to the first friction component and relative to the second friction component.

14. A device for dampening radial oscillatory movement of a rotating shaft, comprising:
(a) a first friction component defining an opening through which the shaft extends, the opening defining an axis along which the shaft generally rotates, the first frictional component being fixed against radial movement relative to the axis, and
(b) a second friction component connected with the first friction component to abut a friction surface therebetween, the second friction component moving radially relative to the axis and sliding on the friction surface, the rotor shaft extending through the second friction component and rotating relative thereto such that a sufficient deviation of the shaft from the axis engages the second friction component and radially moves the second friction component while in abutment with and relative to the friction surface.

15. The device of claim 14, further comprising means for selectively pressing the second friction component in abutment with the friction surface for adjusting the frictional forces therebetween.

16. The device of claim 14, further comprising an intermediate friction member including the friction surface disposed in abutment with the second friction component, and further having another friction surface disposed in abutment with the first friction component, the intermediate friction member sliding in frictional resistance relative to both the first friction component and the second friction component.

17. In an open-end spinning device having a spinning rotor mounted to a rotor shaft and supported for rotation at a high rotary frequency by a contactless, passive, radial support, a dampening device for the contactless, passive, radial support of the spinning rotor, comprising a friction device having friction components which include mechanically loaded friction surfaces, one of the friction components comprising a limiting bearing that is arranged in a manner which is stationary at least radially, and the other friction component comprising a plain bearing bush that is disposed for shifting its position radially and that surrounds the rotor shaft with a bearing play in the area of the plain bearing bush which is less than a bearing play of the limiting bearing.

18. In an open-end spinning device having a spinning rotor mounted to a rotor shaft and supported for rotation at a high rotary frequency by a contactless, passive, radial support, a dampening device for the contactless, passive, radial support of the spinning rotor comprising a friction device having (a) friction components which include mechanically loaded friction surfaces, one of the friction components being arranged in a manner which is stationary at least radially, and the other friction component being disposed for shifting its position radially, the shiftable friction component comprising a bearing component which surrounds the rotor shaft of the rotor, and (b) a mechanical stop comprising a ring arranged on the stationary friction component that abuts and defines the maximum radial deflection of the shiftable friction component.

19. In an open-end spinning device having a spinning rotor mounted to a rotor shaft and supported for rotation at a high rotary frequency by a contactless, passive, radial support, a dampening device for the contactless, passive, radial support of the spinning rotor comprising a friction device having (a) friction components which include mechanically loaded friction surfaces, one of the friction components being arranged in a manner which is stationary at least radially, and the other friction component being disposed for shifting its position radially, the shiftable friction component comprising a bearing component which surrounds the rotor shaft of the rotor, and (b) a mechanical stop comprising screw bolts fixed to the stationary friction component which extend through oversized bores defined in the shiftable friction component and abuts and thereby defines the maximum radial deflection of the shiftable friction component relative to the stationary friction component.

20. In an open-end spinning device having a spinning rotor mounted to a rotor shaft and supported for rotation at a high rotary frequency by a contactless, passive, radial support, a damping device for the contactless, passive, radial support of the spinning rotor comprising a friction device having (a) friction components which include mechanically loaded friction surfaces, one of the friction components being arranged in a manner which is stationary at least radially, and the other friction component being disposed for shifting its position radially, the shiftable friction component comprising a bearing component which surrounds the rotor shaft of the rotor, and (b) an intermediate friction plate arranged between the friction components.

* * * * *